Patented July 14, 1936

2,047,889

UNITED STATES PATENT OFFICE 2,047,889

BAKING ENAMEL

Stephen John Roskosky, Flint, Mich., assignor to E. I. du Pont de Nemours & Company, Wilmington, Del., a corporation of Delaware No Drawing. Application November 3, 1931, Serial No. 572,880. Renewed August 29, 1935

7 Claims. (Cl. 134—26)

This invention relates to new articles of manufacture comprised of metal, or rigid products capable of withstanding a high baking temperature having an improved finish of baked asphalt varnish. More particularly, the invention relates to the application of such finishes to automobile fenders.

The black baking enamels commonly known are composed essentially of oil and asphalts of low fixed carbon content. The most common is gilsonite with an average fixed carbon content of 15%. Asphalts of this type are generally characterized by good solubility, comparatively low melting point, and poor gloss retention. These asphalts have a small proportion of fixed carbon and are readily compatible in all proportions in raw or heat treated oils and are soluble in aliphatic hydrocarbons such as kerosene and turpentine substitute. The usual practice in making varnishes from these asphalts is to melt the asphalt with all of the oil or add all the oil after first melting out the asphalt. If the oil is a prepared one, in which case it usually contains the drier, the oil-asphalt base is pulled off the fire shortly after the asphalt is melted out. If the oil is untreated the oil-asphalt base is held on the fire until the proper viscosity is obtained. In both cases the base is allowed to cool to about 425–450° F. and is reduced with kerosene and turpentine substitute. These ordinary oil-asphalt varnishes which have heretofore been used by the trade as black baking enamels rapidly lose their gloss when exposed to ordinary atmospheric conditions, especially sunlight. Much time and labor is necessary to polish such a surface back to its original glossy appearance. Furthermore, the dull appearance recurs shortly if the article is re-exposed.

I am fully aware that high fixed carbon asphalts have been used in baking enamels but they have always been used in small proportions (too small to improve durability) in order to improve their color, whereas to practice my invention, it is necessary for the gum content to be at least 75% of high fixed carbon asphalt. Much better results are obtained if such asphalts are used straight. Previous attempts to substitute high fixed carbon asphalts in large amounts for the low fixed carbon asphalts in ordinary fender enamels were invariably accompanied with high viscosity, unstability or incompatibility, which made the enamel unsuitable for use in a fender enameling system. Unstability as used herein denotes excessive viscosity increase or livering of the enamel or a precipitation of solids on aging. Livering may occur shortly after the enamel is made up or on aging several months and is preceded by a gradual increase in viscosity. Incompatibility manifests itself by a dull appearance of the baked film or a seedy or granular suspension in the wet enamel or both. Because of the unsatisfactory viscosity characteristics (i. e., poor flowing qualities which makes a composition unsuitable as a baking enamel) and because of the other disadvantages mentioned, attempts to make useful baking enamels with high fixed carbon asphalts were discontinued, although the compositions were in some respects satisfactory for other purposes by brushing, spraying, or dipping in small tanks. The term "baking enamel" as used herein means one that is satisfactory for use in a fender enameling system and which has a viscosity which will enable it to flow out under various operating conditions so that the baked film is hard and free from sags and wrinkles. Furthermore, it must maintain this condition after continued use in the system.

In enamels for coating metal objects, such as fenders, the trade requires products of extremely good stability and working properties, as it is common practice to use these enamels in tanks containing 4,000 to 7,000 gallons with a like amount in storage. The daily replacement with fresh material varies from about ¼% to 2½%. Furthermore, during certain periods, the tanks may be idle without any replacements being made.

This invention has as an object the production of improved oil-asphalt varnishes. A further object resides in the new process for making these varnishes or enamels from asphalts containing a high ratio of fixed carbon. A still further object is the production of new products having a baked finish characterized by exceptional durability and retention of luster. Another object is a process for making such products. Other objects will appear hereinafter.

These objects are accomplished by the following invention in which a varnish comprised of asphalts with a high fixed carbon content, above 25%, and an oil is applied to the article to be finished and the product baked, as will more fully appear hereinafter.

Asphalt as used herein denotes a bituminous substance, either natural or processed, in which the non-mineral constituents are largely soluble in carbon disulphide and are fusible alone or when fluxed with other varnish gums or oils.

I have discovered that asphalts with a high fixed carbon content of 25% or more can be combined with oil to yield enamels of outstanding durability. Although these asphalts are characterized by a low degree of compatibility and a high melting point it is, nevertheless, possible, by following the procedure hereinafter described, to make practical enamels of excellent durability.

By the proper selection of the asphalts, solvents, oils and gums, and by proceeding in accordance with the methods outlined herein, compatible and stable enamels can be produced from a wide variety of high fixed carbon asphalts. The term "gum" as used herein refers to the common varnish gums such as rosin, rosin ester, asphalts, coumarone resin, indene resin, oil soluble bakelites and fossil gums, such as Congo, manila and kauri.

The procedure for making oil-asphalt varnishes from the asphalts having a low fixed carbon content conventionally used in the prior art is not usually applicable in the manufacture of varnishes from asphalts having a high ratio of fixed carbon inasmuch as these asphalts are less compatible when melted out with a large quantity of oil, especially if the oil is heat treated. In general, as the fixed carbon increases the compatibility with oils decreases. I have found, however, and this is my preferred procedure, that if the high fixed carbon asphalts are melted with but a portion of the fatty oil, either untreated or only treated to a small degree, the base thus formed allowed to cool, and Hi-flash naphtha or equivalent hydrocarbon solvent added together with kerosene, and then the remainder of the oil added, a compatible oil-asphalt varnish is produced. The drier may be incorporated either by adding it to the oil when it is given a short heat treatment or it may be added as a liquid drier after the varnish is prepared. With some of the lower melting processed asphalts it is possible to melt them out and reduce with the solvent while still hot, after which oil can be added, but with other asphalts, as the one used in Example III below, it is necessary to cold cut the asphalt with the aromatic solvent before adding the oil in order to get the maximum degree of compatibility.

The following examples illustrate suitable enamel compositions that may be used in the practice of the invention.

*Example I*

| | Parts by weight |
|---|---|
| Asphalt A | 200 |
| Refined linseed oil | 234 |
| Hi-flash naphtha | 100 |
| Kerosene | 300 |
| Iron drier | 24 |

Asphalt "A" used in the above example is a natural asphalt mined in South America having a fixed carbon content of 31.7% and an ash content of .18%.

The varnish is prepared by melting the asphalt with 156 parts of linseed oil at 600° F. The temperature is then lowered to 450° F., the Hi-flash naphtha and kerosene are added and then the balance of the linseed oil and the iron drier. The Hi-flash naphtha and kerosene impart the proper flowing qualities to the composition.

*Example II*

| | Parts by weight |
|---|---|
| Asphalt "B" | 500 |
| Refined linseed oil | 300 |
| Raw fish oil | 300 |
| Lump burnt umber | 16 |
| Manganese resinate | 6 |
| Japanners' brown | 2 |
| Kerosene | 734 |
| Hi-flash naphtha | 244 |

Asphalt "B" is a natural asphalt mined in (source unknown but probably) South America having a fixed carbon content of 29.2% and an ash content of 1.3%.

The varnish is prepared by first heating the refined linseed oil and raw fish oil with the umber suspended in the oil for 40 minutes at 600° F. Two hundred eighty parts of this prepared oil, the manganese resinate, Japanners brown, and the asphalt are heated to 580° F. and held until the asphalt is melted out. This mixture is allowed to cool to 450° F. when the kerosene and Hi-flash naphtha are added and then the remainder of the prepared oil.

*Example III*

| | Parts by weight |
|---|---|
| Asphalt C | 80 |
| Hi-flash naphtha | 120 |
| Refined linseed oil | 96 |
| Kerosene | 110 |
| Iron drier | 4 |

Asphalt "C" used in the above example is a natural asphalt mined in Cuba having a fixed carbon content of about 41% and an ash content of 1.08%.

The varnish is prepared by cutting the asphalt in the Hi-flash naphtha by agitating for about fifteen hours until solution is complete. To the asphalt solution, which is warmed to 200° F., is added warm (about 200° F.) refined linseed oil. Kerosene and the iron drier are next added.

The iron drier mentioned in Examples I and III is composed of the following ingredients:

| | Pounds |
|---|---|
| Linseed oil acids | 150 |
| Rosin | 600 |
| Basic ferric acetate | 75 |
| Hi-flash naphtha | 750 |

It is made by heating the rosin and linseed oil acids to about 300° F. The basic ferric acetate is stirred slowly into the mixture and the temperature raised to about 400° F. and held at this point until the basic ferric acetate is dissolved. The Hi-flash naphtha is then added.

The Hi-flash naphtha referred to herein is a solvent well known to the trade and may be defined as an aromatic hydrocarbon having a boiling range of approximately 145° C.–210° C.

My preferred compositions, such as those made from asphalts mentioned in connection with Example I, have a viscosity from about 20 to 30 seconds.

The viscosity is the time in seconds for 50 cubic centimeters of the material to flow through a 0.15 inch orifice at 28° C. The viscosity cup has an inside diameter of 1⅜ inches and is 3$\frac{1}{16}$ inches high. The orifice, which is located in the center of the cup, is 0.15 inch in diameter and $\frac{1}{16}$ inch long. At the start of the determination, the finger is held over the orifice and the cup is filled to the top. No additional material is added after the determination is started.

The fixed carbon was determined by a common method known to the art and a description thereof may be found in "Asphalts and Allied Substances," by Abraham.

It may, as a general rule, be stated that the durability (retention of luster) improves as the fixed carbon content of the asphalt increases. Thus, a varnish made by the substitution of gilsonite, for the high fixed carbon asphalts in Examples I, II, and III, results in enamels of vastly inferior durability whereas the substitution of asphaltenes which have approximately 47% fixed carbon for an asphalt, which has a fixed carbon content of about 29.2%, produces a marked improvement in durability. Other asphalts which I have found to have excellent durability are: a natural asphalt mined in Barbados having a fixed carbon content of 27.9% and an ash content of .60%; a processed petroleum asphalt with a fixed carbon content of 36.1% and an ash content of .11%; and a processed petroleum asphalt with a fixed carbon content of 25.3% and an ash content of .21%.

I have found that the aromatic hydrocarbon solvents, of which Hi-flash naphtha is an example, are especially effective in preventing excessive viscosity increase and livering, and materially aid compatibility. The amount of aromatic solvent to be used in the enamel depends upon the fixed carbon content; the type of asphalt, whether natural or processed; the type of oil used; and the amount of other diluents, such as rosin. Of the total solvent in my preferred formulae I generally use one part by weight of a potent aromatic solvent, such as Hi-flash naphtha to two parts of a weaker and cheaper aliphatic solvent, such as kerosene. Larger amounts of aromatic solvent, up to 100 per cent, can be used and produce a more stable, although less economical enamel. Lesser amounts of aromatic solvents can be used, but I prefer to have a factor of safety to take care of the wide variation in operating conditions prevailing in the art. Aromatic hydrocarbon solvents, other than the Hi-flash naphtha mentioned in the examples, that may be added to the composition for the purpose of preserving its stability, compatibility, and flowing qualities are solvent naphtha, xylol, toluol, and benzol. These solvents may be incorporated into the varnish by adding the solvent after the asphalt and oil have been hot blended as set forth in connection with Example I, or they may be incorporated by the cold blending method, referred to in Example III.

In addition to the aromatic hydrocarbon solvents mentioned other agents which I have found to enhance stability and compatibility and which can be substituted in whole or in part for the Hi-flash naphtha are: turpentine, aromatic amines, such as aniline, and aromatic hydroxy compounds, such as cresol. The term "aromatic solvent" as used herein refers to hydrocarbons or substituted hydrocarbons of the benzene and terpene series of the nature of those mentioned which are known to those skilled in the art to be powerful solvents. These solvents aid compatibility and stability in which respect they are much more potent than aliphatic hydrocarbons. Because of their high cost these aromatic solvents are used as sparingly as possible. Kerosene has been mentioned in the examples as an aliphatic solvent for use with the aromatic solvent in my improved enamels because kerosene is a cheap high boiling solvent which imparts the proper flowing properties to the enamel and evaporates from the film at the baking temperatures commonly used. As a substitute for kerosene there may be mentioned a mixture of aliphatic hydrocarbons with higher and lower boiling ranges than kerosene which would impart the proper flowing properties. Still other agents which enhance stability and compatibility and which, in addition to the ingredients mentioned above, may form a part of the baked film are: rosin, rosin ester, coumarone resin, indene resin, oil soluble bakelites, non-drying, semi-drying, and drying oil acids, such as oleic acid, cottonseed oil acids and linseed oil acids, and fossil gums, such as Congo, manila, and kauri.

I have also found that asphalts from different sources often vary widely as to their physical and chemical characteristics and as to the quantity and nature of the impurities contained in them. The method of processing also affects the characteristics of the asphalt. There are, for these reasons, some asphalts so difficultly compatible with oils that it is practically impossible to obtain a homogeneous mixture of the asphalt and oil in the most satisfactory proportions; i. e., about 15 gallons of oil for each 100 pounds of asphalt. A "gallon" oil length, as used in the varnish trade, designates a gallon of oil per 100 pounds of gum. By weight, this is generally about eight pounds of oil to 100 pounds of gum. The term "gallon" or "gallon length", as used herein, designates eight pounds of oil per 100 pounds of asphalt. It is to be understood, therefore, that the asphalts comprehended herein are those compatible with the oils described herein, and those which may be made to yield a compatible product by the methods previously set forth, the requisite compatibility referred to being capable of determination by simple test.

I have found that untreated oils are much more compatible and stable with high fixed carbon asphalts than heat treated oils but as the fixed carbon increases compatibility with all oils decreases. When the incorporation of driers, such as umber, necessitates heating the oil, the time of the heat treatment should not be prolonged beyond about 2½ hours at 600° F. or an equivalent time at some other temperature.

My improved asphalt varnish compositions may contain from 5 gallons of oil (40 pounds of oil per 100 pounds of asphalt) to 30 gallons of oil (240 pounds of oil per 100 pounds of asphalt). The best results, however, are obtained with 15 gallon lengths; i. e., 15 gallons of oil (about 120 pounds) per 100 pounds of asphalt.

In addition to linseed oil various fatty oils of the drying type may be mentioned as suitable for use in these varnish compositions. The term "drying oil" as used herein comprehends also those oils known as semi-drying oils. Examples of some oils other than linseed are: fish oil, rapeseed oil, soya bean oil, cottonseed oil, China-wood oil, and rubberseed oil.

The driers suitable for use in connection with the present invention are preferably organic compounds of metals, which act as driers, such as iron, manganese, cobalt, or lead. These driers may be incorporated in the oil or added as liquid driers in the usual manner known in the art.

After application of a coat of a varnish of the type previously described to the fender, the coated article is baked at a temperature above 325° F. Temperature between 350° F. and 450° F. yield films of satisfactory hardness in the shortest time about ½ hour at 450° F. and 2 hours at 350° F. As the baking temperature drops below 350° F., the baking time in hours becomes disproportionately large. Thus, while about two hours is sufficient at 350° F., the time rises to 12 hours at 325° F. and to 24 hours at 300° F. At temperatures below 325° F. the baking time becomes too long for the economical or practical production of films having the requisite hardness for fender enamels.

The films obtained by baking the varnishes disclosed herein, and preferably at high temperatures for relatively short periods of time, are because of their hardness coupled with outstanding durability, high luster and long retention of luster, exceptionally valuable as fender enamels. Tests have shown that automobile fenders having a baked coating of the asphalt varnishes described herein will retain, upon exposure to the sun and weather, their intense black color and high luster for from two to many times as long as the varnishes commonly used.

As many apparently widely different embodiments of this invention may be made without departing from the spirit and scope thereof, it is to be understood that I do not limit myself to the specific embodiments thereof, except as defined in the appended claims.

I claim:

1. A baking enamel comprising a drier and a solution in drying oil, and aromatic solvent of an asphalt having a fixed carbon content above 25%, said asphalt constituting at least 75% of the gum content of said enamel, the asphalt and drying oil being present in a ratio of from 40 to 240 pounds of oil per 100 pounds of asphalt.

2. A baking enamel comprising the following approximate composition in which the asphalt has a fixed carbon content not less than about 30%: asphalt 200 parts by weight, linseed oil 234 parts by weight, Hi-flash naphtha 100 parts by weight, kerosene 300 parts by weight, and iron drier 24 parts by weight.

3. A process for making coating compositions containing a solution of asphalt having a fixed carbon content above 25% in a solvent mixture of drying oil, aromatic solvent, and aliphatic hydrocarbon solvent, which comprises homogeneously combining said asphalt with the drying oil in a ratio of from 40 to 240 pounds of oil per 100 pounds of asphalt by melting the asphalt with a portion of the drying oil, adding the aromatic and aliphatic solvents, and adding the remainder of the drying oil.

4. A process for making coating compositions containing a solution of asphalt having a fixed carbon content above 25% in a solvent mixture of drying oil, Hi-flash naphtha, and kerosene, which comprises homogeneously combining said asphalt with the drying oil in a ratio of from 40 to 240 pounds of oil per 100 pounds of asphalt by melting the asphalt with a portion of the drying oil, lowering the temperature of the solution, adding the Hi-flash naphtha and kerosene, and adding the remainder of the drying oil.

5. A process for making a baking enamel which comprises dissolving an asphalt having a fixed carbon content above 25% in Hi-flash naphtha, adding linseed oil and kerosene and incorporating drier into the enamel, said asphalt and drying oil being homogeneously combined by said process in the proportion of from 40 to 240 pounds of oil per 100 pounds of asphalt.

6. Metal having an adherent lustrous film of baked asphalt drying oil-varnish in which the asphalt has a fixed carbon content above 25% and which constitutes at least 75% of the gum present in the varnish.

7. A process which comprises applying to a metal article a coating of an asphalt varnish in which the asphalt has a fixed carbon content above 25% and which constitutes at least 75% of the gum present in the varnish, said varnish comprising a drier and a solution of said asphalt in fatty oil and organic solvent in which the asphalt and drying oil are present in said composition in a ratio of from 40 to 240 pounds of oil per 100 pounds of asphalt, and baking the coating above 325° F. until hard.

STEPHEN J. ROSKOSKY.